Patented Oct. 20, 1942

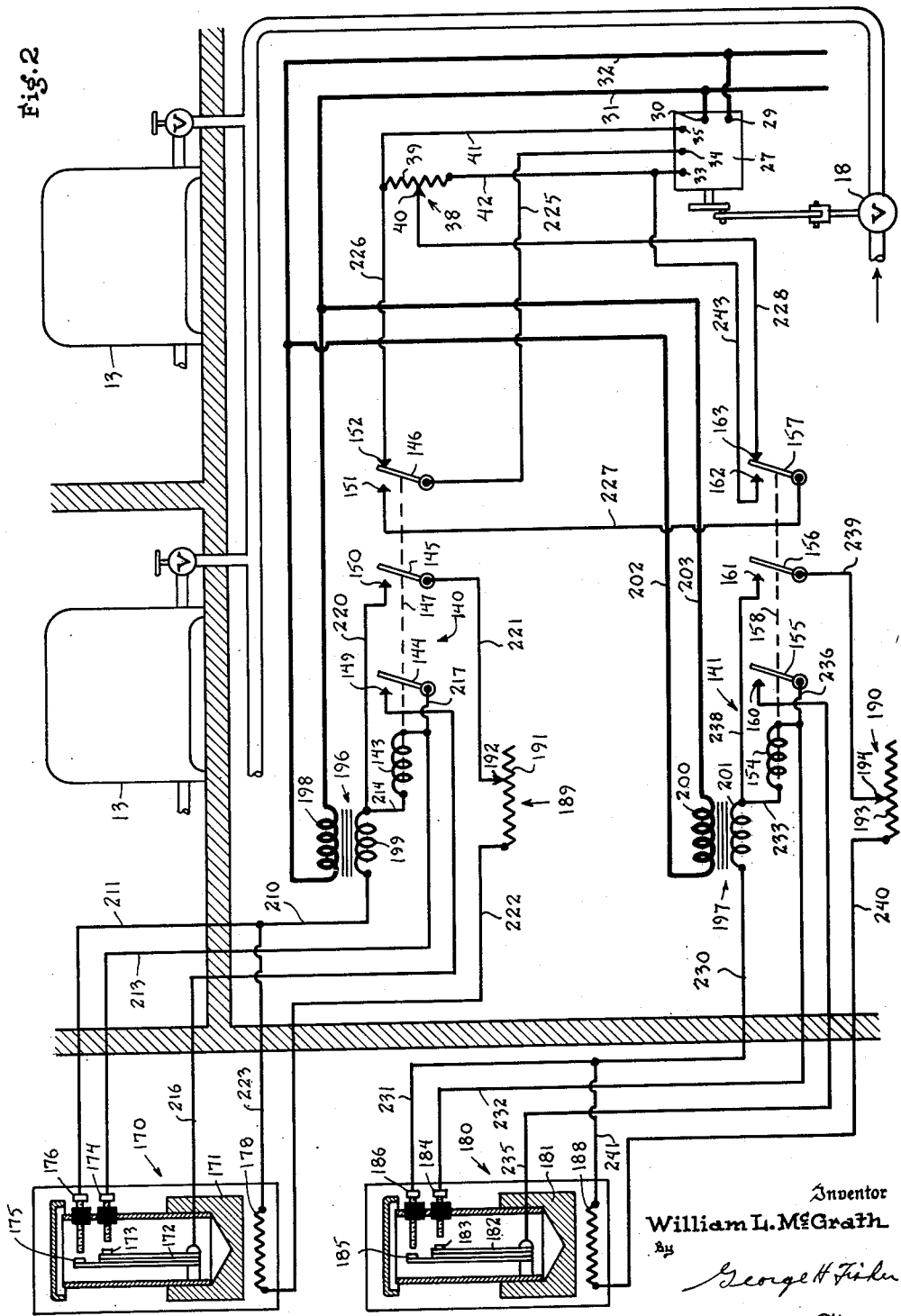

2,299,163

UNITED STATES PATENT OFFICE 2,299,163

CYCLING MULTISTAGE TEMPERATURE CONTROL SYSTEM

William L. McGrath, St. Paul, Minn., assignor to Minneapolis-Honeywell Regulator Company, Minneapolis, Minn., a corporation of Delaware Application December 24, 1938, Serial No. 247,564

13 Claims. (Cl. 236—68)

The present invention is concerned with a cycling multi-stage temperature control system and more particularly with such a system employing outdoor control means similar to that forming the basis of the patent to D. G. Taylor No. 2,065,835 of December 29, 1936.

The system disclosed in the above referred to patent comprises an outdoor controller responsive to outdoor atmospheric conditions including temperature, wind and solar radiation for controlling the temperature within the building. A heating means is provided in the building for supplying heat for the building and a heating means is also provided in the outdoor controller for supplying heat to the outdoor controller. The two heating means are proportioned according to the heat losses from the building and from the outdoor controller. A thermostatic device is provided in the outdoor controller for responding to the temperature of the outdoor controller. When this thermostatic device calls for heat, both of the heating means are simultaneously rendered effective to deliver heat to the building and to the outdoor controller. Due to the proportional relationship between the two heating means and the heat losses from the building and from the outdoor controller, a definite temperature relationship is maintained between the building and the outdoor controller so that by responding to the temperature of the outdoor controller, the thermostatic device maintains a substantially constant or normal temperature within the building.

The system disclosed in the above mentioned Taylor patent has the disadvantage that it is very difficult to obtain an adjustment of the system such that the device supplies a proper amount of heat to the building in both mild and severe weather. An adjustment made for mild weather often results in inadequate heat being supplied in cold weather. Moreover, particularly in the case of steam heating, it is undesirable to have too long periods in which the radiators are not supplied with steam since during this period the radiators cool off and an uncomfortable condition is produced in the room. With the above described system, in very mild weather the heating plant is operated only for very short periods of time so that the "off" periods are very much greater than the "on" periods.

An attempt is made to overcome the above described difficulty in the patent to Taylor No. 2,073,326 issued March 9, 1937. The system disclosed in this patent is of the so-called "modulating" type. In this system, both the heating means for the outside controller and the heating means for the building are constantly operated, and upon any change in the temperature of the controller, a corresponding adjustment is made of both the heating plant and the heating means for the outside controller. The object of this system is to maintain a continuous supply of heat to the building which is just adequate to compensate for heat losses from the building. In other words, such a system has as its object the attainment for any given heat loss of a perfectly stable condition wherein no change is made in the heating effect of the controller or of the heating plant itself. While such a system is highly desirable if it can be properly adjusted, it is extremely difficult from a practical standpoint to adjust such a system. In a cycling type of control, more heat is provided than is necessary with continued operation of the heating plant to sustain the desired temperature. The extent to which this heat delivery is in excess of that which would be required with continuous operation does not affect the temperature of the building but merely affects the time which the heating plant operates. It can readily be seen that in a system employing a heated outside controller of the type discussed, the proper adjustment of a modulating system is extremely difficult. Not only must the heat supplied to the building and the heat supplied to the controller be proportioned for every possible position of the regulator for the heating medium but these values must be such as to balance the heat losses at the corresponding temperatures. A modulating system, moreover, has the disadvantage particularly in steam systems that as the pressure of this steam is reduced in the throttling process, the distribution of steam becomes faulty unless various extra appliances are added to the system. In other words, a steam system requires that the pressure of the steam be above a predetermined minimum for proper operation whereas the modulating system of the Taylor patent requires that the steam pressure be modulated along with the heat in the outside controller to a negligible value in mild weather. For these reasons, the system of the Taylor Patent 2,073,326 despite its theoretically excellent performance has not yet proved desirable from a practical standpoint.

The present invention is concerned with improvements in a cycling type of system. In a cycling type of system, as pointed out above, no attempt is made to select the rate of heat supply which is just sufficient to maintain the desired temperature when the heating plant is operated continuously. In a cycling type of heating system, more heat is supplied than is necessary with continuous operation to sustain the desired temperature.

An object of the present invention is to provide a multi-stage cycling temperature control system employing a outside control means of the type discussed in which both the temperature changing means for the space and the temperature changing means for the outside controller are caused to vary in temperature changing effect back and forth between different sets of widely separated values dependent upon the temperature changes of said control means.

A further object of the invention is to provide such a multi-stage system in which there is an independently adjustable regulator for the temperature changing means of the control means for each stage of operation.

A still further object of the invention is to provide a multi-stage heating system of the above type in which an electrical heater is employed as the temperature changing means of the controller and in which a separately adjustable impedance element is provided for each of the stages of operation.

A still further object of the invention is to provide such a system in which the outside control means consists of a single controller having a series of sequentially engaging contacts.

A still further object of the invention is to provide such a system in which the outside control means consists of as many controllers as there are stages of operation.

Other objects of the present invention will be apparent from a consideration of the accompanying specification, claims and drawings of which—

Figure 1 is a schematic showing of one form of the invention, and in which

Figure 2 is a schematic showing of a second form of the invention.

Figure 1:
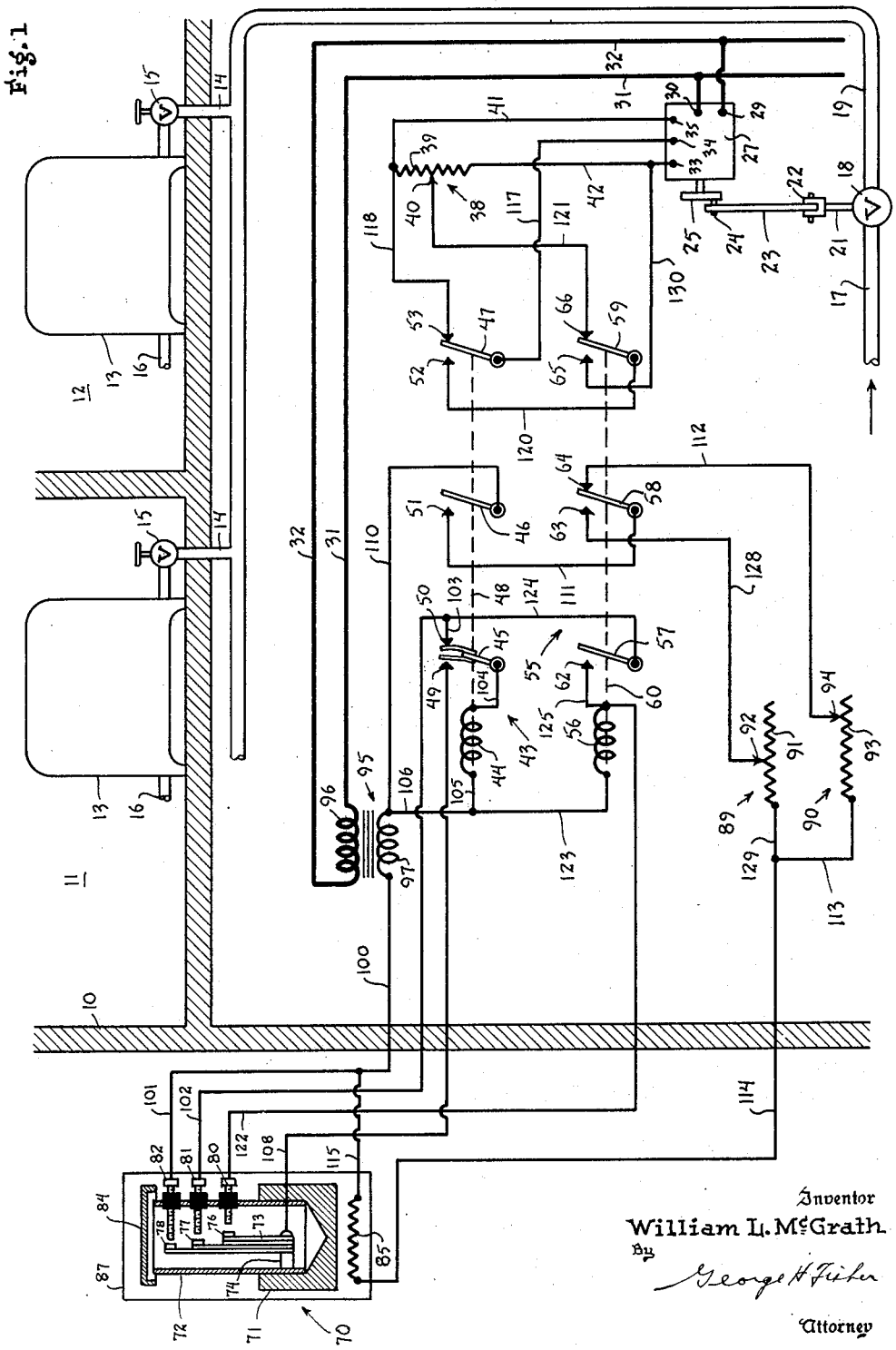

The invention is shown as applied to a building having an outside wall 10 and a plurality of spaces or rooms 11 and 12 to be heated, although the control system may be applied to any space. Located in the rooms or spaces 11 and 12 are heat exchangers or radiators 13 which receive a supply of heating fluid, such as steam, from risers 14 under the control of manually operated shut-off valves 15. The expended heating fluid may be taken from the heat exchangers or radiators 13 by means of pipes 16 and disposed of in any suitable manner. Leading from some source of heating fluid, such as a constantly energized boiler or a central power plant, is a supply pipe 17. The flow of heating fluid from the supply pipe 17 to a header pipe 19 is controlled by means of a valve 18. The risers 14 connect into the header pipe 19 so that when the valve 18 is moved to open position heating fluid is delivered from the pipe 17 to the heat exchangers or radiators 13. When the valve 18 is moved to closed position, a further supply of heating fluid to the heat exchangers or radiators 13 is prevented.

The valve 18 is adapted to be moved to either an extremely closed or an extremely open position, or is adapted to be positioned at any desired point intermediate these extreme positions by valve stem 21. A yoke 22 is secured to the valve stem 21 and pivotally secured to the yoke is a link 23 connected to the crank pin 24 of a crank disc 25. The crank disc 25 is secured to the shaft of a motor assembly 27.

Motor assembly 27 is of the type disclosed in the above mentioned Taylor Patent No. 2,073,326. This motor assembly comprises a reversible motor which drives the shaft to which crank disc 25 is secured, a relay controlling the energization of the motor, and a rebalancing potentiometer which in conjunction with a control potentiometer controls the energization of the relay. This type of motor control is generally referred to as a proportioning control and has the property that the motor is caused to always assume a position proportional to the position of the control potentiometer.

The motor assembly 27 is provided with power terminals 29 and 30 which are connected to line wires 31 and 32 leading to any suitable source of power (not shown). The motor assembly 27 is further provided with control terminals 33, 34, and 35. A control potentiometer is designated by the reference numeral 38. This control potentiometer comprises a resistance 39 and a sliding contact 40. The upper terminal of resistance 39 is connected to terminal 35 by conductor 41 and the lower terminal of resistance 39 to terminal 33 by conductor 42. As will be apparent from the subsequent description, the terminal 34 is connected to either terminal 33 or 35 or to the slider 40 in accordance with the operation of the control apparatus to be described. The terminal 34 is the common or central terminal. When the resistance between terminals 34 and 33 is reduced with respect to that between terminals 34 and 35, the valve goes towards open position. When the resistance between terminals 34 and 35 is reduced with respect to that between terminals 33 and 34, the valve goes towards closed position. When terminal 34 is directly connected to either terminal 33 or terminal 35, the motor moves to the wide open position of the valve or to valve closed position, respectively. When the terminal 34 is connected to slider 40, the motor assumes a position dependent upon the position of slider 40.

The connections of terminal 34 to the other terminals 33 and 35 and to slider 40 are controlled by two relays 43 and 55. Relay 43 comprises a relay coil 44 and three switch blades 45, 46 and 47, which switch blades 45, 46, and 47 are operatively associated with an armature 48 indicated in dotted lines. Also associated with switch blades 45, 46, and 47 are contacts 49, 50, 51, 52 and 53. Switch blades 45, 46, and 47 are biased to the right, switch blades 45 and 47 being biased into engagement with contacts 50 and 53. Upon energization of the relay coil 44, switch blades 45, 46 and 47 are moved against the action of the biasing means into engagement with contacts 49, 51, and 52, respectively. The switch blade 45 is designed so that it is "overlapping" in action. In other words, upon movement to energized position, it engages contact 49 before it disengages contact 50.

Relay 55 comprises a relay coil 56 which is operatively associated with switch blades 57, 58, and 59. Connected to the switch blades 57, 58, and 59 is an armature 60 which is effective upon energization of relay coil 56 to move the switch blades 57, 58, and 59 towards the left against the action of biasing means which tends to move the switch blades to the right. Switch blades 57, 58, and 59 are adapted to selectively engage contacts 62, 63, 64, 65, and 66. In their deenergized position, switch blades 58 and 59 engage contacts 64 and 66, respectively. In their energized position, the switch blades engage contacts 62, 63, and 65, respectively.

Located outside of the building so as to respond to the same atmospheric conditions as the building, including temperature, wind, and solar radiation, is an outdoor controller generally designated by the reference numeral 70. The outdoor controller 70 comprises a metallic block 71 which is hollowed out to receive a container 72. Located within the container 72 is a bimetallic element 73 mounted upon a post 74. The bimetallic element 73 carries a contact 76 and controls contacts 77 and 78. The contacts 76, 77, and 78 are adapted to sequentially engage adjustable contacts 80, 81, and 82 upon a decrease in the temperature affecting the thermostatic element 73. The contacts 80, 81, and 82 are adjustably mounted in container 72 by means of suitable insulation. The conductor 72 is closed at its upper end by means of a cover 84 so that the thermostatic element will not be directly affected by outside temperature but will respond directly to the temperature of the block 71. Block 71 is cooled by the outdoor atmosphere and is heated by means of a heater which may be in the form of an electrical resistance heater 85. The outdoor controller 70 is enclosed within a weather tight casing diagrammatically shown at 87.

The energization of heater 85 is controlled by two rheostats 89 and 90. Rheostat 89 comprises a resistance element 91 over which slides contact 92. Rheostat 90 comprises a resistance element 93 and a sliding contact 94.

Low voltage power for operation of the control system is supplied by a step-down transformer 95. This transformer comprises a line voltage primary 96 connected to line wires 31 and 32 and a low voltage secondary 97.

Operation of Figure 1 species

The various elements of the system are shown in the position which they occupy when the temperature of the controller 70 is above the desired temperature. Let it be assumed that the block 71 gradually cools off so that the bimetallic element 73 is deflected to the right to cause engagement first of contacts 78 and 82 and then of contacts 77 and 81. Upon engagement of contacts 78 and 82, nothing happens. As soon as contacts 77 and 81 are engaged, the following circuit is established to relay coil 44: from the left-hand terminal of secondary 97 through conductors 100 and 101, contacts 82 and 78, contacts 77 and 81, conductors 102 and 103, contact 50, switch blade 45, conductor 104, relay coil 44, and conductors 105 and 106 to the other terminal of secondary 97. The energization of relay 44 as a result of the above established circuit causes switch blades 45, 46, and 47 to move into engagement with contacts 49, 51, and 52, respectively. As pointed out previously, the switch blade 45 is of the overlapping type so that it engages contact 49 before it breaks contact 50. Upon the switch blade 45 engaging contact 49, the following holding circuit is established to relay coil 44: from the left-hand end of secondary 97 through conductors 100 and 101, contacts 82 and 78, through the contact carrying blade which supports contact 78, conductor 108, contact 49, switch blade 45, conductor 104, relay coil 44, and conductors 105 and 106 to the other terminal of secondary 97. This new energizing circuit, it will be noted, is independent of contact 77 so that this circuit will remain energized until the temperature has risen to the point where contacts 78 and 82 are separated. This provides for a temperature differential between the energization and deenergization of the relay and thus eliminates any chattering action of the relay such as might otherwise occur when the thermostat approached or receded from its associated contacts. Immediately after switch blade 45 engages contact 49, it separates from contact 50 to interrupt the energizing circuit previously traced.

The engagement of relay switch blade 46 with contact 51 results in the following circuit being established to the heater 85: from the right-hand terminal of secondary 97 through conductor 110, switch blade 46, contact 51, conductor 111, switch blade 58, contact 64, conductor 112, slider 94, resistance 93, conductors 113 and 114, heater 85, and conductors 115 and 100 to the other terminal of secondary 97. It will thus be noted that heater 85 is now energized, the energization being dependent upon the setting of slider 94 of rheostat 90.

As the elements are shown in the drawing, the terminal 34 of motor assembly 27 is connected by conductor 117, switch blade 47, contact 53, and conductors 118 and 41 to terminal 35. As previously explained, when terminal 34 is connected directly to terminal 35, the motor is moved to a position corresponding to valve closed position. Thus, as shown in the drawing, the valve is closed. When, however, relay coil 44 is energized to cause engagement of relay switch blade 47 with contact 52, the circuit between terminals 34 and 35 is interrupted and terminal 34 is connected to contact 40 as follows: from terminal 34 through conductor 117, switch blade 47, contact 52, conductor 120, switch blade 59, contact 66, and conductor 121 to the slider 40. As previously explained, the motor assembly 27 causes the crank disc 25 to assume a position dependent upon the position of slider 40. As shown in the drawings, this position is substantially half way between open and closed positions.

It will thus be seen that the result of the engagement of contacts 77 and 78 with contacts 81 and 82 is that the valve 18 is moved to a partially open position and the heater 85 is energized under the control of rheostat 90. Rheostat 90 is so adjusted that the amount of current flowing to rheostat 85 is much less than when rheostat 89 is connected in the circuit, as will be described later. The result is that both the heating plant of the building, including the radiators 13, and the heater 85 of the outdoor controller are supplying considerably less than their full output of heat. The rheostat 90 is so adjusted at the time of installation of the system that the heat supplied by heater 85 bears the same relation to the heat supplied by the radiators of the valve in the partially open position as the respective heat losses from the controller 70 and the building. This adjustment, it will be seen, can be readily made on the basis of calculated heat losses and by a limited amount of experimentation after the system is installed.

The settings of the sliders 40 and 94 controlling the partially open position of valve 18 and the current supplied to heater 85 when the valve is in such partially open position are so selected that the heat supplied by the radiators 13 will take care of the demands during relatively mild weather. Under such circumstances, the two heating means will continue in operation until the temperature of the block 71 has risen to a point such as to cause disengagement of both contacts 77 and 78 from contacts 81 and 82. When such disengagement of contacts 78 and 82 is effected, the relay 44 moves to its deenergized position so that motor assembly 27 causes valve 18 to close and the heater 85 is deenergized. This cycle will be repeated as often as necessary to maintain the temperature of the controller 70 at the desired temperature which incidently results in the temperature in spaces 11 and 12 also being maintained at the desired temperature. The frequency of these cycles will depend upon the temperature outdoors and consequently upon the heating demand. The "on" cycles, however, will be much longer than if the valve were open fully and the heater 85 correspondingly energized.

Let it be assumed that the outdoor temperature drops to the point where the heating plant is unable to take care of the heating load and where the heater 85 when energized through rheostat 90 is unable to maintain the block temperature at the desired value. Under these circumstances, the temperature drops still further to cause engagement not only of contacts 77 and 81 but also of contacts 76 and 80. When contacts 76 and 80 are brought into engagement the following circuit will be established to relay coil 56: from the left-hand terminal of secondary 95 through conductors 100 and 101, contacts 82 and 78, contacts 76 and 80, conductor 122, relay coil 56, and conductors 123 and 106 to the right-hand terminal of secondary 97. As soon as relay coil 56 is energized, switch blades 57, 58 and 59 are moved into engagement with contacts 62, 63, and 65. The moving of switch blade 57 into engagement with contact 62 results in the establishment of the following holding circuit to relay coil 56: from the left-hand terminal of secondary 97 through conductors 100 and 101, contacts 82 and 78, contacts 77 and 81, conductors 102 and 124, switch blade 57, contact 62, conductor 125, relay coil 56, and conductors 123 and 106 to the right-hand terminal of secondary 97. It will be noted that the holding circuit just traced is independent of the engagement of contacts 76 and 80 so that relay coil 56 is not deenergized until contact 77 disengages from contact 81. Thus again, a temperature differential is introduced between the energization and deenergization of relay coil 56.

The moving of switch blade 58 into engagement with contact 63 results in the following circuit being established to the heater 85: from the right-hand terminal of secondary 97, through conductor 110, switch blade 46, contact 51, conductor 111, switch blade 58, contact 63, conductor 128, slider 92, resistance 91, conductors 129 and 114, heater 85, and conductors 115 and 100 to the other terminal of secondary 97. It will be noted that the movement of switch blade 58 into engagement with contact 63 also interrupts the energizing circuit to heater 85 through contact 94. The current flowing to heater 85 is thus now controlled solely by rheostat 89. It will be noted that the slider 92 of rheostat 89 is so positioned that the impedance of rheostat 89 is considerably less than that of rheostat 90 so that heater 85 receives more heat than when its energization was controlled by rheostat 90.

The movement of switch blade 59 into engagement with contact 65 results in the terminal 34 being connected to terminal 33 as follows: from terminal 34 through conductor 117, switch blade 47, contact 52, conductor 120, switch blade 59, contact 65, and conductor 130 to terminal 33. This results in the motor assembly causing the crank disc 25 to move to valve open position as previously explained.

With the valve 18 fully open, the radiators 13 are supplying their maximum amount of heat to the spaces 11 and 12. The heater 85 is also giving off much more heat than when the valve was in its intermediate position. Again, the amount of heat given off by heater 85 is proportioned with respect to the heat given off by radiators 13 in accordance with the heat losses from the outdoors and from the building. It will be noted that again the energization of heater 85 is determined by an entirely independent adjusting means, namely, the slider 92. Thus the adjustment made in one position of the valve in no way affects the adjustment made for the other position. It is thus entirely possible to properly adjust the heating system with a minimum of calculations and experiments. Moreover, if the ratio of heat loss from the controller and the building is different in mild weather than in severe weather, this difference can be readily taken care of by the separate adjustable rheostats.

In connection with the separate adjustments of rheostats 87 and 89, it is to be understood that two completely separate rheostats need not be employed. It is entirely within the scope of this invention to employ a single resistor with separate contacts therein which are selectively connected into the circuit. Such an arrangement still results in the contacts being independently adjustable.

It is to be understood that with the valve wide open and with the heater 85 being supplied with an increased amount of energy, the temperature of the controller 70 will eventually rise to cause disengagement of contact 76 from contact 80 and contact 77 from contact 81. The separation of contact 77 from contact 81 results in relay coil 56 being deenergized so that the valve is again moved to its intermediate position and rheostat 90 is again placed in control of the energization of heater 85. In severe weather, this will result in the building and the controller cooling off so that the cycle last described is again repeated. Under slightly milder weather conditions, there may be cycling in both stages. In other words, the time required for heater 85 to heat controller 70 sufficiently to offset the heat loss therefrom may be so great that the temperature drops to the point where contacts 76 and 80 are brought into engagement to bring on the second stage. The effect of the operation of this second stage after a long operation of the first stage may result in the temperature rising to a point where not only contacts 77 and 81 are separated but at which contacts 78 and 82 are also separated. At no time will the heating plant operate continuously to supply exactly the right amount of heat although in intermediate weather this condition will be approached but never exactly attained. The result is that there is no need for the very accurate adjustment that there is in the proportioning type of system. At the same time, the periods of heat delivery will be much longer than with the on and off type of system disclosed in the above mentioned Taylor Patent 2,065,835. Moreover, during cold weather, the radiators will always have the minimum amount of steam supplied to them and hence will never become entirely cold, thus avoiding the disagreeable drafts arising in cold weather when the radiators are cold.

*Species of Figure 2*

The form of the invention shown in Figure 2 differs from that of Figure 1 primarily in the substitution of two outside controllers for the single controller of Figure 1 and in the changes incidental to such substitution. Inasmuch as the building heating plant including the radiators 13, the valve 18, and the motor assembly 27 are the same as in Figure 1, these elements will not be described in detail and the same reference numerals have been applied thereto as in Figure 1. The same is true of the control potentiometer 38 and the connections of the resistor thereof to the terminals of the motor assembly 27.

As in the previous form, there are two relays, these relays being designated by the reference numerals 140 and 141. The relay 140 comprises a relay coil 143 and switch blades 144, 145, and 146. Associated with the switch blades is an armature 147 which is adapted to be moved to the left and similarly move the switch blades upon energization of the relay coil 143. All of the switch blades 144, 145, and 146 are biased to the right. The switch blades are adapted to selectively engage contacts 149, 150, 151, and 152. When the relay coil 143 is deenergized, switch blade 146 engages contact 152. When the relay coil 143 is energized, switch blades 144, 145, and 146 are moved into engagement with contacts 149, 150, and 151.

Relay 141 comprises a relay coil 154 and switch blades 155, 156, and 157. The switch blades are associated with an armature 158 and is adapted to move the switch blades to the left upon energization of the relay coil. The switch blades 155, 156, and 157 are adapted to selectively engage contacts 160, 161, 162, and 163. The switch blades are all biased to the right and switch blade 157 when in such position engages contact 163. Upon energization the switch blades are moved to the left and switch blades 155, 156, and 157 engage contacts 160, 161, and 162, respectively.

A controller generally designated by the reference numeral 170 and corresponding to controller 70 is located outside of the space. This controller 170 like controller 70 comprises a block 171 and a bimetallic element 172 responsive to the temperature of the block and carrying a contact 173 which is adapted to engage contact 174. The bimetallic element 172 further controls the position of a contact 175 which is adapted to be moved into engagement with a contact 176. Contacts 173 and 175 are sequentially spaced from contacts 174 and 176 so that upon bimetallic element 172 moving to the right as it does upon a temperature rise, contacts 175 and 176 are first moved into engagement and then contacts 173 and 174 are moved into engagement. The block 171 is cooled by the outside atmospheric conditions and is heated by a heater 178. The controller 170 otherwise corresponds exactly to controller 70 so that it is deemed unnecessary to further describe the details thereof.

A second similar controller 180 is also located outside of the space. This controller has a block 181 and a bimetallic element 182 which carries a contact 183 adapted to engage a fixed contact 184. The bimetallic element 182 also controls a contact 185 which is adapted to engage a fixed contact 186, contacts 185 and 186 being less widely spaced than contacts 183 and 184. The block 181 is heated by an electrical heater 188.

The energization of heaters 178 and 188 is controlled by rheostats 189 and 190, respectively. Rheostat 189 comprises a resistance 191 and a sliding contact 192, while rheostat 190 comprises a resistance 193 and a sliding contact 194.

Power for the energization of relay coils 143 and 154 is supplied by step-down transformers 196 and 197, respectively. Step-down transformer 196 comprises a line voltage primary 198 and a low voltage secondary 199. The step-down transformer 197 comprises a line voltage primary 200 and a low voltage secondary 201. The primaries 198 and 200 are connected to line wires 31 and 32, the connection of primary 200 being effected by conductors 202 and 203.

*Operation of species of Figure 2*

The various elements of this species are likewise shown in the position which they assume when the valve is completely closed and wherein the temperature of both controllers are above the desired values. The controller 170 is set at a somewhat higher temperature than the controller 180. Let it be assumed that the temperature of the block 171 drops to the point such that contacts 175 and 176 and contacts 173 and 174 are sequentially moved into engagement. The engagement of contacts 175 and 176 has no effect. However, as soon as the contacts 173 and 174 are moved into engagement, an energizing circuit is established to relay coil 143 as follows: from the left-hand terminal of secondary 199 through conductors 210 and 211, contacts 176 and 175, contacts 173 and 174, conductor 213, relay coil 143, and conductor 214 to the other terminal of secondary 199. The establishment of this energizing circuit to relay coil 143 results in switch blades 144, 145, and 146 moving into engagement with contacts 149, 150, and 151. The movement of switch blade 144 into engagement with contact 149 results in the establishment of the following holding circuit to relay coil 143: from the left-hand terminal of secondary 199 through conductors 210 and 211, contacts 176 and 175, the contact carrying blade of contact 175, conductor 216, contact 149, switch blade 144, conductor 217, relay coil 143, and conductor 214 to the terminal of secondary 199. It will be noted that this holding circuit is independent of contacts 173 and 174 so that the holding circuit is not interrupted until contacts 175 and 176 are disengaged. Thus, as in the preceding species, a differential is required between the energization and deenergization of the relay coil.

The movement of switch blade 145 into engagement with contact 150 establishes the following circuit to heater 178: from the right-hand terminal of secondary 199 through conductor 220, contact 150, switch blade 145, conductor 221, contact 192, resistance 191, conductor 222, heater 178, and conductors 223 and 210 to the other terminal of secondary 199. The heater 178 will thus be supplied with current, the magnitude of which is dependent upon a setting of slider 192.

While switch blade 146 is in engagement with contact 152, a circuit is established between terminals 34 and 35 as follows: from terminal 34 through conductor 225, switch blade 146, contact 152, and conductors 226 and 41. As long as this circuit is established, the valve is maintained in closed position. Upon switch blade 146 being moved into engagement with contact 151, however, as a result of the energization of relay 146, the following circuit is established between the terminal 34 and the sliding contact 38: from terminal 34 through conductor 225, switch blade 146, contact 151, conductor 227, switch blade 157, contact 163, and conductor 228 to contact 40. As explained in connection with the species of Figure 1, when the terminal 34 is connected to contact 40 the valve is caused to assume a position dependent upon the setting of contact 40, which is shown as a substantially mid position.

It will be noted from the foregoing description that the effect of the controller 170 calling for heat is substantially the same as that which results in the preferred species when the first two sets of contacts are closed. In other words, the valve is open only part way to admit a small supply of steam to the radiators. The current supplied to the heater 178 is such that even in relatively mild weather an appreciable time is required for the temperature of the block 171 to rise sufficiently to cause separation of contacts 175 and 176. The steam supplied to radiators 13 is supplied at a sufficiently slow rate, however, that overheating of the building does not result.

Let it be assumed now that the outside weather becomes more severe so that it is impossible to supply an adequate amount of heat by maintaining the valve in its intermediate position. Under these conditions, the outside temperature will be such as to cause engagement of not only contacts 185 and 186 but also of contacts 183 and 184. When these two sets of contacts are engaged, an energizing circuit is established to relay coil 154 as follows: from the left-hand terminal of secondary 201 through conductors 230 and 231, contacts 186 and 185, contacts 183 and 184, conductor 232, relay coil 154 and conductor 233 to the other terminal of relay coil 201. The energization of relay coil 154 results in switch blades 155, 156, and 157 being moved into engagement with contacts 160, 161, and 162, respectively. The movement of switch blade 155 into engagement with contact 160 results in the following holding circuit being established to relay coil 154: from the left-hand end of secondary 201 through conductors 230 and 231, contacts 186 and 185, the contact blade which carries contact 185, conductor 235, contact 160, switch blade 155, conductor 236, relay coil 154 and conductor 233 to the other terminal of secondary 201. As in the preceding cases, this holding circuit has as its function to maintain the relay energized until the temperature has risen sufficiently to effect the disengagement of the first to be engaged of the thermostatic contacts.

The movement of switch blade 156 into engagement with contact 161 results in the following energizing circuit being established to the heater 188: from secondary 201 through conductor 238, contact 161, switch blade 156, conductor 239, slider 194, resistance 193, conductor 240, heater 188, and conductors 241 and 230 to the other terminal of secondary 201. It will be noted that this circuit results in heater 188 being energized under the control of rheostat 193.

The movement of switch blade 157 into engagement with contact 162 results in the establishment of the following circuit between terminals 34 and 33: from terminal 34 through conductor 225, switch blade 146, contact 151, conductor 227, switch blade 157, contact 162, and conductor 243 to terminal 33. The connection with terminals 33 and 34 results in the motor moving the valve to wide open position.

The heating plant is now operating at its full capacity so that it is capable of taking care of the major heat loss due to the more severe outside temperature. At the same time, the heating effect of heater 188 is sufficiently greater that the temperature of block 187 will sooner or later rise to the point at which contacts 185 and 186 are separated. When this takes place, the relay coil 154 will be deenergized so that the motor will return the valve to its intermediate position.

It will be seen that in this species as in the preceding species there are two stages of operation and that in the case of each stage it is possible to accurately adjust the current input to the heater of the outside controller so that heat supplied thereby bears the same relation to the heat supplied by the building heating plant as the respective heat losses of the outside controller and the building. Thus with this form also, the disadvantages of a plain single space cycling system such as described in Patent No. 2,065,835 are avoided while, at the same time, the practical difficulties involved in the operation of the modulating system of Patent No. 2,073,326 are also avoided.

While specific embodiments of the invention have been described for purposes of illustration, the invention is to be limited only by the scope of the appended claims.

I claim as my invention:

1. In a temperature control system, temperature changing means for a space, a controller outside of the space and including temperature changing means and thermostatic means responsive to the temperature of the controller, said thermostatic means including a plurality of pairs of contacts which are sequentially closed upon continuous temperature change in one direction, electrically operated means for controlling the operation of both said temperature changing means for the space and said temperature changing means for the controller, means connecting the contacts of said thermostatic means with said electrically operated means and operative to cause said electrically operated means to cause the operation of both said temperature changing means for the space and the temperature changing means of the controller at a rate dependent upon the number of pairs of contacts in engagement.

2. In a temperature control system, temperature changing means for a space, a plurality of controllers outside of the space and each including temperature changing means and thermostatic means responsive to the temperature of the controller, the thermostatic means of each controller being set for a different temperature, and means controlled by the thermostatic means of said controllers for rendering effective the temperature changing means of the controllers when the thermostatic means thereof call for a temperature change and for simultaneously causing operation of the temperature means for the space at a rate determined by the number of outside controllers whose thermostatic means are calling for temperature change.

3. In a temperature control system, temperature changing means for a space, control means outside of the space and including thermostatic means and local temperature changing means, a plurality of relays, means controlled by said thermostatic means for sequentially energizing said relays as the temperature of the control means changes in one direction, and means for operating both said local temperature changing means and the temperature changing means for the space at rates dependent upon the number of relays which are energized.

4. In a temperature control system, temperature changing means for a space, a plurality of controllers outside of the space and each including temperature changing means and thermostatic means responsive to the temperature of the controller, the thermostatic means of each controller being set for a different temperature, a relay associated with each controller, means associated with each relay and controlled by the thermostatic means of the associated controller for energizing said relay, means operative upon energization of any of said relays to render effective the temperature changing means of the associated controller and to cause the operation of the temperature changing means for the space at a rate dependent upon the number of relays which are energized.

5. In a temperature control system for a space, temperature changing means for the space, regulating means in control of said temperature changing means for causing substantially no temperature changing effect, an intermediate temperature changing effect and a maximum temperature changing effect to the space, and control means outside of said space for controlling said regulating means, said control means being operative when the outside control means is subjected to a temperature within one range of temperature to cause alternately said substantially no temperature changing effect and said intermediate temperature changing effect and when the outside control means is subjected to a temperature within another range of temperature to cause alternately said intermediate temperature changing effect and said maximum temperature changing effect.

6. In a temperature control system for a space, temperature changing means for the space, regulating means in control of said temperature changing means for causing substantially no temperature changing effect, an intermediate temperature changing effect and a maximum temperature changing effect to the space, and control means outside of said space for controlling said regulating means, said control means being operative when the outside control means is subjected to a temperature within one range of temperature to cause alternately said substantially no temperature changing effect and said intermediate temperature changing effect, the relative lengths of time of said intermediate temperature changing effect and said substantially no temperature changing effect varying in accordance with the value of said outside temperature within said one range of temperature, and when the outside control means is subjected to a temperature within another range of temperature to cause alternately said intermediate temperature changing effect and said maximum temperature changing effect, the relative lengths of time of said maximum temperature changing effect and said intermediate temperature changing effect varying in accordance with the value of said outside temperature within said other range of temperature.

7. In a temperature control system for a space, temperature changing means for the space, valve means in control of said temperature changing means, and control means outside of said space for controlling said valve means, said control means being operative when the outside control means is subjected to a temperature within one range of temperature to cause said valve means to cycle back and forth between a substantially closed position and an intermediate position and when the outside control means is subjected to a temperature within another range of temperature to cause said valve means to cycle back and forth between said intermediate position and a substantially open position.

8. In a temperature control system for a space, temperature changing means for the space, valve means in control of said temperature changing means, and control means outside of said space for controlling said valve means, said control means being operative when the outside control means is subjected to a temperature within one range of temperature to cause said valve means to cycle back and forth between a substantially closed position and an intermediate position, the relative lengths of time during which the valve means is in the intermediate position and in the substantially closed position varying in accordance with the value of outside temperature within said one range of temperature, and when the outside control means is subjected to a temperature within another range of temperature to cause said valve means to cycle back and forth between said intermediate position and a substantially open position, the relative lengths of time during which the valve means is in the substantially open position and in the intermediate position varying in accordance with the value of the outside temperature within said other range of temperature.

9. In a temperature control system for a space, temperature changing means for the space, control means outside of the space including thermostatic means and temperature changing means, regulating means in control of said space temperature changing means and the temperature changing means of said control means for causing substantially no temperature changing effect, an intermediate temperature changing effect and a maximum temperature changing effect to said building and said control means, said thermostatic means controlling said regulating means when the outside temperature is within one range of temperature to cause alternately said substantially no temperature changing effect and said intermediate temperature changing effect to said space and said control means and when the outside temperature is within another range of temperature to cause alternately said intermediate temperature changing effect and said maximum temperature changing effect to said space and said control means.

10. In a temperature control system for a space, temperature changing means for the space, control means outside of the space including thermostatic means and temperature changing means, regulating means in control of said space temperature changing means and the temperature changing means of said control means for causing substantially no temperature changing effect, an intermediate temperature changing effect and a maximum temperature changing effect to said building and said control means, said thermostatic means controlling said regulating means when the outside temperature is within one range of temperature to cause alternately said substantially no temperature changing effect and said intermediate temperature changing effect to said space and said control means, the relative lengths of time of said intermediate temperature changing effect and said substantially no temperature changing effect varying in accordance with the value of said outside temperature within said one range of temperature, and when the outside temperature is within another range of temperature to cause alternately said intermediate temperature changing effect and said maximum temperature changing effect to said space and said control means, the relative lengths of time of said maximum temperature changing effect and said intermediate temperature changing effect varying in accordance with the value of said outside temperature within said other range of temperature.

11. In a temperature control system, temperature changing means for a space, control means outside of the space and including thermostatic means and local temperature changing means, a plurality of relays, means controlled by said thermostatic means for sequentially energizing said relays as the temperature of the control means changes in one direction, means for initiating operation of both said local temperature changing means and the temperature changing means for the space when the first to be energized of said relays is energized, and means controlled by the next to be energized of said relays for increasing the temperature changing effect of both said local temperature changing means and the temperature changing means for the space when said relay is energized.

12. A system for controlling the supply of heat to a building comprising means for supplying heat to the building at either low rate or high rate, a casing having radiation characteristics similar to those of the building for exposure to similar weather conditions outside said building, means for supplying heat to said casing at either low rate or high rate, a plurality of relays for controlling said building heat supply means, one relay causing heat to be supplied to the building at low rate and the other relay causing heat to be supplied to the building at high rate, and thermostatic means in said casing for actuating said first relay and causing heat to be supplied to the casing at low rate upon a decrease in outdoor temperature and for actuating the other relay and causing heat to be supplied to the casing at high rate upon a further decrease in outdoor temperature.

13. In a temperature control system, temperature changing means for a space, a plurality of controllers outside of the space and each including separate casing means, temperature changing means and thermostatic means responsive to the temperature of the respective controllers, the thermostatic means of each controller being set for a different temperature, and means controlled by the thermostatic means of said controllers for rendering effective the temperature changing means of the controllers when the thermostatic means thereof call for a temperature change and for simultaneously causing operation of the temperature means for the space at a rate determined by the number of outside controllers whose thermostatic means are calling for temperature change.

WILLIAM L. McGRATH.